(12) United States Patent
Liu

(10) Patent No.: US 11,393,492 B2
(45) Date of Patent: Jul. 19, 2022

(54) VOICE ACTIVITY DETECTION METHOD, METHOD FOR ESTABLISHING VOICE ACTIVITY DETECTION MODEL, COMPUTER DEVICE, AND STORAGE MEDIUM

(71) Applicant: TENCENT TECHNOLOGY (SHENZHEN) COMPANY LIMITED, Guangdong (CN)

(72) Inventor: Haibo Liu, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 148 days.

(21) Appl. No.: 16/678,001

(22) Filed: Nov. 8, 2019

(65) Prior Publication Data

US 2020/0090682 A1 Mar. 19, 2020

Related U.S. Application Data

(63) Continuation of application No. PCT/CN2018/102982, filed on Aug. 29, 2018.

(30) Foreign Application Priority Data

Sep. 13, 2017 (CN) .......................... 201710824269.5

(51) Int. Cl.
*G10L 25/84* (2013.01)
*G06N 3/04* (2006.01)
(Continued)

(52) U.S. Cl.
CPC ................ *G10L 25/84* (2013.01); *G06N 3/04* (2013.01); *G06N 3/08* (2013.01); *G10L 15/02* (2013.01);
(Continued)

(58) Field of Classification Search
CPC ......... G10L 15/02; G10L 15/16; G10L 15/22; G10L 25/21; G10L 25/84; G06N 3/04; G06N 3/08
See application file for complete search history.

(56) References Cited

U.S. PATENT DOCUMENTS 9,460,711 B1 * 10/2016 Vanhoucke ........... G10L 15/063
9,892,745 B2 * 2/2018 Dimitriadis ............. G10L 25/84
(Continued)

FOREIGN PATENT DOCUMENTS

CN 102522081 A 6/2012
CN 105469785 A 4/2016
(Continued)

OTHER PUBLICATIONS

Speech Activity Detection Using Deep Neural Networks, May 2017.*

(Continued)

*Primary Examiner* — Mohammad K Islam
(74) *Attorney, Agent, or Firm* — Sughrue Mion, PLLC

(57) ABSTRACT

A method for establishing a voice activity detection model includes obtaining a training audio file and a target result of the training audio file, framing the training audio file to obtain an audio frame, extracting an audio feature of the audio frame, the audio feature comprising at least two types of features, inputting the extracted audio feature as an input to a deep neural network model, performing information processing on the audio feature through a hidden layer of the deep neural network model, and outputting the processed audio feature through an output layer of the deep neural network model, to obtain a training result; determining a bias between the training result and the target result, and inputting the bias as an input to an error back propagation (Continued)

mechanism, and updating weights of the hidden layer until the deep neural network model reaches a preset condition.

14 Claims, 11 Drawing Sheets

(51) Int. Cl.
*G06N 3/08* (2006.01)
*G10L 15/02* (2006.01)
*G10L 15/16* (2006.01)
*G10L 15/22* (2006.01)
*G10L 25/21* (2013.01)

(52) U.S. Cl.
CPC .............. *G10L 15/16* (2013.01); *G10L 15/22* (2013.01); *G10L 25/21* (2013.01)

(56) References Cited

U.S. PATENT DOCUMENTS

| | | | | |
|---|---|---|---|---|
| 10,134,425 | B1* | 11/2018 | Johnson, Jr. | G10L 15/05 |
| 10,706,873 | B2* | 7/2020 | Tsiartas | G10L 15/1822 |
| 11,037,330 | B2* | 6/2021 | Bar-On | H04N 19/436 |
| 2015/0058004 | A1* | 2/2015 | Dimitriadis | G10L 25/78 704/233 |
| 2015/0161995 | A1* | 6/2015 | Sainath | G10L 15/063 704/232 |
| 2016/0284347 | A1* | 9/2016 | Sainath | G06N 3/0454 |
| 2016/0379632 | A1* | 12/2016 | Hoffmeister | G10L 25/87 704/253 |
| 2017/0092268 | A1* | 3/2017 | Kristjansson | G10L 15/16 |
| 2017/0162194 | A1* | 6/2017 | Nesta | G10L 25/30 |
| 2017/0270919 | A1* | 9/2017 | Parthasarathi | G10L 15/02 |
| 2019/0355345 | A1* | 11/2019 | Fu | G10L 15/22 |
| 2019/0378498 | A1* | 12/2019 | Sainath | G06N 3/084 |
| 2020/0251183 | A1* | 8/2020 | Kashefhaghighi | G16B 20/20 |
| 2020/0334539 | A1* | 10/2020 | Wang | G06K 9/627 |
| 2021/0012200 | A1* | 1/2021 | Lyske | G10H 1/0008 |
| 2021/0201003 | A1* | 7/2021 | Banerjee | G06K 9/00248 |

FOREIGN PATENT DOCUMENTS

| | | |
|---|---|---|
| CN | 105529038 A | 4/2016 |
| CN | 105788592 A | 7/2016 |
| CN | 106782511 A | 5/2017 |
| CN | 107146601 A | 9/2017 |
| CN | 108346428 A | 7/2018 |
| GB | 2546325 A | 7/2017 |

OTHER PUBLICATIONS

Efficient Processing of Deep Neural Networks: A Tutorial and Survey, Aug. 2017.*
Deep Neural Networks for Multi-Room Voice Activity Detection, May 2016.*
Back Propagation Feed forward neural network approach for Speech Recognition, Jan. 2014.*
English Translation of Written Opinion of the International Searching Authority of PCT/CN2018/102982 dated Nov. 16, 2018.
International Search Report of PCT/CN2018/102982 dated Nov. 16, 2018 [PCT/ISA/210].
Chen Shuo, "Research on the Application of Deep Learning Neural Networks in Speech Recognition", South China University of Technology, Chinese Excellent Master's Degree Thesis Full-Text Database Information Technology Series, Jan. 15, 2014, No. 1, pp. 11140-11194 (total 77 pages).
Communication dated Mar. 2, 2020 from the State Intellectual Property Office of the P.R.C. in Application No. 201710824269.5.

* cited by examiner

VOICE ACTIVITY DETECTION METHOD, METHOD FOR ESTABLISHING VOICE ACTIVITY DETECTION MODEL, COMPUTER DEVICE, AND STORAGE MEDIUM

CROSS-REFERENCE TO RELATED APPLICATIONS

This application is a continuation of International Patent Application No. PCT/CN2018/102982 filed on Aug. 29, 2018, which claims priority from Chinese Patent Application No. 201710824269.5, entitled "VOICE ACTIVITY DETECTION, METHOD FOR ESTABLISHING MODEL THEREOF, APPARATUS, DEVICE, and STORAGE MEDIUM" and filed in the Chinese Patent Office on Sep. 13, 2017, which are incorporated herein by reference in their entireties.

BACKGROUND

1. Field

Embodiments of the present disclosure relates to the field of speech information processing technologies, and in particular, to a voice activity detection method, a method for establishing a voice activity detection model, a computer device, and a storage medium.

2. Description of Related Art

With development of information technology, speech information is being widely used, and voice activity detection (VAD) is of a significant importance for speech information processing. The VAD is also referred to as speech endpoint detection and speech boundary detection. The VAD indicates detecting presence or absence of a speech in an environment including noises, and is generally used in a speech processing system, such as speech encoding and speech enhancement, to produce effects of, for example, reducing a speech encoding rate, saving communication bandwidth, reducing energy consumption of a computer device, and improving a recognition rate.

A conventional voice activity detection method is an energy-based voice activity detection method. According to this method, noise is considered to be stable, and energy of a speech portion is higher than the energy of a noise portion. Determining presence or absence of a voice activity is performed according to this method, and its main advantages may be good applicability to a situation with stable noise and relatively wide applicability. However, its disadvantages are poor effects in an environment with unstable noises, and is susceptible to erroneous judgments. Therefore, a problem of poor detection accuracy exists in the conventional voice activity detection method.

SUMMARY

According to various embodiments in the present disclosure, a voice activity detection method, a method for establishing a voice activity detection model, a computer device, and a storage medium are provided.

According to an embodiment, there is provided a method for establishing a voice activity detection model, the method being performed by an execution device, the method including obtaining a training audio file and a target result of the training audio file; framing the training audio file to obtain an audio frame; extracting an audio feature of the audio frame, the audio feature comprising at least two types of features, and one of the at least two types of features comprising an energy; inputting the extracted audio feature as an input to a deep neural network model; performing information processing on the audio feature through a hidden layer of the deep neural network model, and outputting the processed audio feature through an output layer of the deep neural network model, to obtain a training result; determining a bias between the training result and the target result, and inputting the bias as an input to an error back propagation mechanism; and separately updating weights of the hidden layer until the deep neural network model reaches a preset condition, to obtain the voice activity detection model.

According to another embodiment, there is provided a computer device including at least one memory configured to store computer program code and at least one processor configured to access the computer program code and operate as instructed by the computer program code. The computer program code including file obtaining code configured to cause the at least one processor to obtain a training audio file; result obtaining code configured to cause the at least one processor to obtain a target result of the training audio file; framing code configured to cause the at least one processor to frame the training audio file to obtain an audio frame; extraction code configured to cause the at least one processor to extract an audio feature of the audio frame, the audio feature comprising at least two types of features, and one of the at least two types of features comprising an energy; inputting code configured to cause the at least one processor to input the audio feature as an input to a deep neural network model, and perform information processing on the audio feature through a hidden layer of the deep neural network model; outputting code configured to cause the at least one processor to output the processed audio feature through an output layer of the deep neural network model, to obtain a training result; and update and optimizing code configured to cause the at least one processor to determine a bias between the training result and the target result as an input to an error back propagation mechanism, and separately update weights of the hidden layer until the deep neural network model reaches a preset condition, to obtain a voice activity detection model.

According to another embodiment, there is provided a non-transitory computer-readable storage medium, storing executable instructions, the executable instructions capable of causing a computer to: obtain a training audio file and a target result of the training audio file; frame the training audio file to obtain an audio frame; extract an audio feature of the audio frame, the audio feature comprising at least two types of features, and one of the at least two types of features comprising an energy; input the audio feature as an input to a deep neural network model, performing information processing on the audio feature through a hidden layer of the deep neural network model, and output the processed audio feature through an output layer of the deep neural network model, to obtain a training result; and determine a bias between the training result and the target result as an input to an error back propagation mechanism, and separately update weights of the hidden layer until the deep neural network model reaches a preset condition, to obtain a voice activity detection model.

Details of one or more embodiments of the present disclosure are provided with reference to accompanying drawings. Other features, objectives, and advantages of the present disclosure will become more obvious with reference to the description herein, the accompanying drawings, and the claims.

BRIEF DESCRIPTION OF THE DRAWINGS

To describe the technical solutions in the embodiments of the present disclosure more clearly, the following describes the embodiments with reference to the accompanying drawings. Apparently, the accompanying drawings in the following description show merely some embodiments, and a person of ordinary skill in the art may still derive other embodiments without creative efforts.

DESCRIPTION OF EMBODIMENTS

To make the objectives, technical solutions, and advantages of the present disclosure clearer and more comprehensible, the following describes the embodiments with reference to the accompanying drawings. It may be understood that the specific embodiments described herein are merely used to explain the present disclosure, but are not intended to limit the protection scope of the present disclosure.

Figure 1:
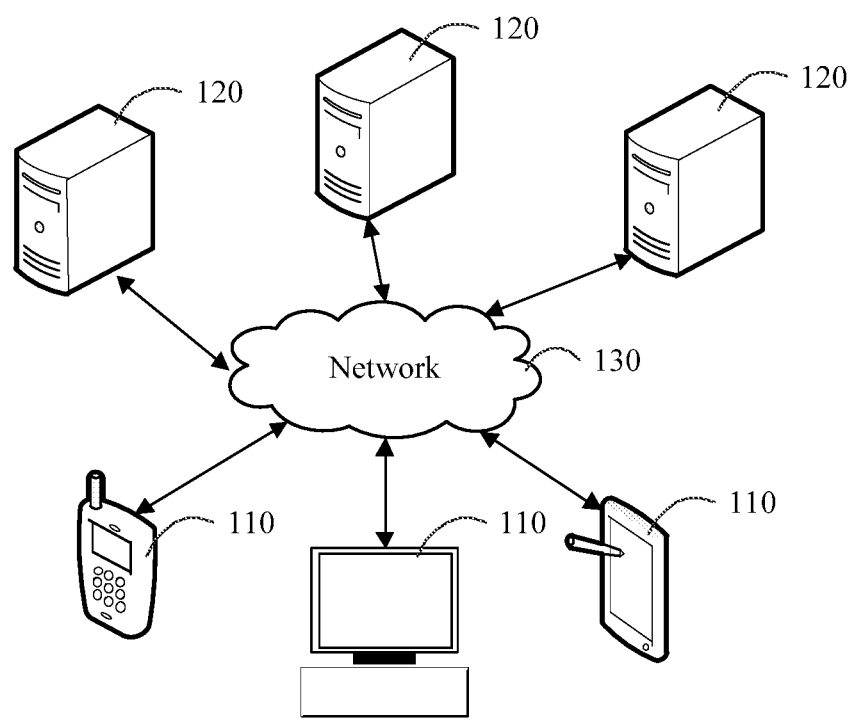
FIG. 1 is a schematic diagram of an application environment according to an embodiment.

The present disclosure may be applied to any scenario in which a voice activity needs to be detected. FIG. 1 shows a schematic diagram of an application environment according to an embodiment. The application environment relates to a terminal 110 and a server 120. The terminal 110 and the server 120 may communicate with each other through a network 130. The terminal 110 may access the corresponding server 120 through the network 130 to request for corresponding voice activity detection, and the server 120 may provide a detection result to the terminal 110. The terminal 110 may be any device capable of implementing intelligent input/output, for example, a desktop terminal or a mobile terminal. The mobile terminal may be a smartphone, a tablet computer, an in-vehicle computer, a wearable intelligent device, or the like. The server 120 may be a server providing voice activity detection. There may be one or more servers 120.

Figure 2:
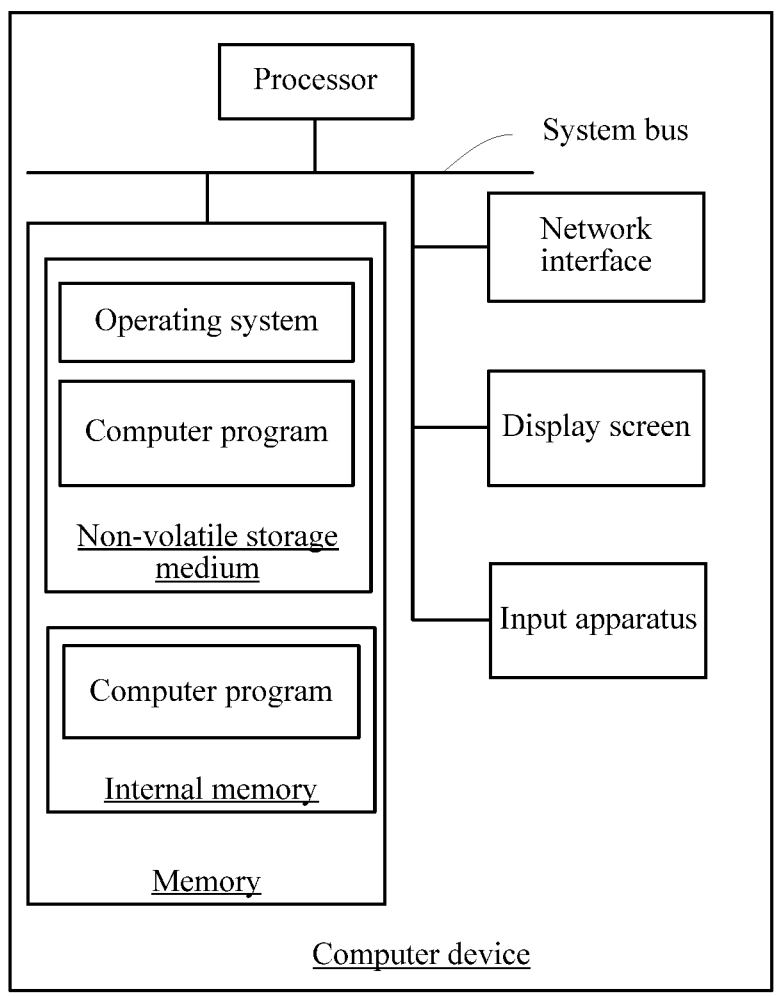
FIG. 2 is a structural block diagram of a computer device according to an embodiment.

FIG. 2 shows a diagram of an inner structure of a computer device according to an embodiment. The computer device may include a processor, a memory, a network interface, an input apparatus, and a display screen that may be connected through a system bus. The memory may include a non-volatile storage medium and an internal memory. The processor may be configured to provide computing and control capabilities to support operations of the computer device. The non-volatile storage medium of the computer device may store an operating system and a computer program. The computer program may execute the processor to perform a method for establishing a voice activity detection model and a voice activity detection method. The internal memory may also store the computer program. The display screen of the computer device may be a liquid crystal display screen or an electronic ink display screen. The input apparatus of the computer device may be a touch layer covering the display screen, or a key, a trackball, or a trackpad disposed on a housing of the computer device, or an external keyboard, trackpad, mouse, or the like.

A person skilled in the art may understand that, the structure shown in FIG. 2 is merely a block diagram of a partial structure related to the solutions of the present disclosure, and does not constitute a limitation to the computer device described herein, and a specific computer device may include more or fewer components than those shown in the figure, or some components may be combined, or a different component deployment may be used.

Figure 3:
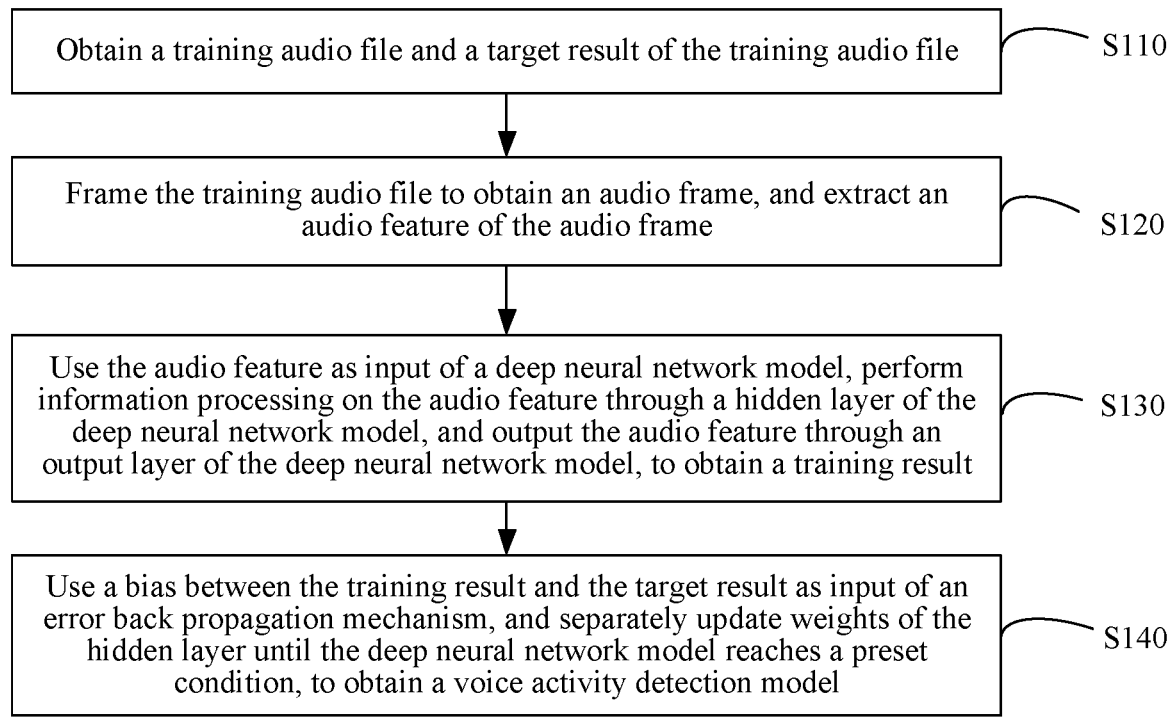
FIG. 3 is a schematic flowchart of a method for establishing a voice activity detection model according to an embodiment.

As shown in FIG. 3, a method for establishing a voice activity detection model is provided. The method for establishing a voice activity detection model may be performed on an execution device. The execution device may be a computer device including a memory and a processor. For example, the execution device may serve as the server in FIG. 1 or the client terminal in FIG. 1, and an internal structure of the execution device may include the structure shown in FIG. 2. The execution device may be a computer device capable of playing an animated picture. The computer device may include a desktop computer, a portable computer, an intelligent mobile terminal, and the like. The intelligent mobile terminal may be a smartphone, a tablet computer, or the like. The method for establishing a voice activity detection model may include the following steps.

In step S110, the method may include obtaining a training audio file and a target result of the training audio file.

The execution device may obtain a training audio file from a training sample and a target result of the training audio file. The training sample may be obtained by performing voice detection on a set of training audio files in a manual recognition manner, and may be used as a target result of the training audio file. The training audio file is an audio file used for training, and may be an audio file in various application environment. The target result is a training result that is expected to be obtained from the training audio, but because the model may not be optimal during a training process, there may be a specific bias between a training result and the target result.

In step S120, the method may include framing the training audio file to obtain an audio frame, and extract an audio feature of the audio frame. The audio feature may include two types of features, such as energy and at least one feature different from the energy.

The execution device may frame an entire training audio file, and then, may perform voice activity detection on each audio frame. During a detection process, the execution device first needs to extract an audio feature of the audio frame. For example, the audio feature may further include at least one other feature, such as a zero-crossing rate, a mean value, and a variance. In a case where a plurality of features are included, the plurality of features may be classified as a plurality of features of a single type or a plurality of features not of a single type. Since different features have different interpretations of speech/non-speech, some features may be effective for stable noises, and some features may be effective for unstable noises. Further, one feature may express speech/non-speech more clearly than another feature and provide a better effect. Specifically, a plurality of features not of a single type may be more comprehensive than a plurality of features of a single type in terms of expressions of speech/non-speech, and therefore, may provide a better effect.

In step S130, the method may include using the audio feature as an input for a deep neural network model, performing information processing on the audio feature through a hidden layer of the deep neural network model, and outputting the audio feature through an output layer of the deep neural network model, to obtain a training result.

Figure 4:
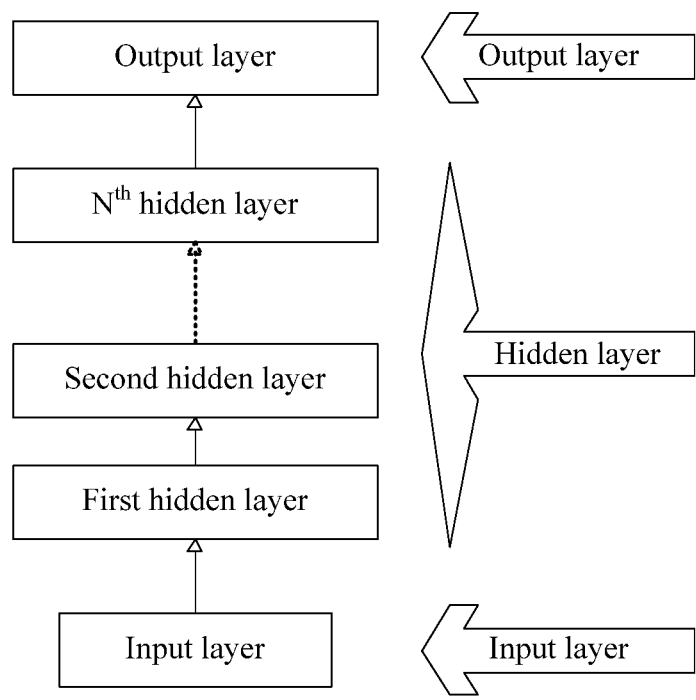
FIG. 4 is a frame structure of a deep neural network model of the method for establishing a voice activity detection model according to an embodiment.

A framework of the deep neural network model, as shown in FIG. 4, may include an input layer, an output layer and a plurality of hidden layers between the input layer and the output layer. The input layer may be used to receive an input feature of the model. According to an embodiment, the input feature may be an audio feature. The output layer may be used to output an output result of the deep neural network model, in which the output result is a training result. The hidden layer may be used for information processing, such as information transferring. The hidden layer may include weights, and the weights may be adjusted and updated during a training process to enable the model to reach a preset condition.

For example, an information transferring rule may be represented as $y=W \cdot z+b$, where $z=f(y_{l-1})$ is a final output obtained after non-linear conversion, W and b are a weight and a bias of a hidden layer, respectively, $y_{l-1}$ is a result of a linear product of a previous layer, f is a non-linear function, and a non-linear function of the hidden layer may be a sigmoid function, which is an S-shaped growth curve function.

In step S140, the method may use a bias between the training result and the target result as an input for an error back propagation mechanism, and separately update weights of the hidden layer until the deep neural network model reaches a preset condition, to obtain a voice activity detection model.

The bias may be a difference between the training result and the target result. The training result and the target result may both be represented by a mark. Each mark corresponds to an identification (ID) represented in a form of a value, and the bias may be represented by a difference between an ID corresponding to the training result and an ID corresponding to the target result. Before the deep neural network model reaches the preset condition, an error back propagation mechanism may be used to update weights of the hidden layers, one layer by one layer, from the output layer to the input layer. Further, the error back propagation mechanism may update the deep neural network model until the deep neural network model reaches the preset condition, and then, the deep neural network model may be used as the voice activity detection model. The error back propagation mechanism may be implemented by using an error back propagation algorithm. The preset condition may be a condition when the deep neural network is optimal. Whether the deep neural network is optimal may be determined by using a loss function. In the loss function, the training audio file in the training sample and the target result of the training audio file may be separately input into the deep neural network model, and the deep neural network becomes optimal when the accuracy of a preset consecutive quantity of times is unchanged. The loss function may be a maximum entropy function and a minimum mean square error function. When the weights of the hidden layers are updated, a stochastic gradient descent method may be used, and after a plurality of iterations, the deep neural network model may finally reach the preset condition. The following formula is used in the stochastic gradient descent method: $W_{t+1}=W_t-\eta \Delta W_t$, where $\eta$ is a learning rate, $W_{t+1}$ is a weight of the $(t+1)^{th}$ hidden layer, $W_t$ is a weight of the $t^{th}$ hidden layer, $\Delta W_t$ is a result after a partial derivative of the weight is obtained in the loss function. In the maximum entropy loss function, a partial derivative of the weight w and the bias b in the loss function may be obtained, and the stochastic gradient descent method may be used to update the weight w and the bias b by iteration.

In the foregoing method for establishing a voice activity detection model, because the audio feature includes energy and at least one feature different from energy, the audio feature carries more information than that of a conventional detection manner. Accordingly, the deep neural network model has a strong learning capability, and a plurality of different features may be input at the same time to train the deep neural network model to obtain the voice activity detection model. As a result, when the voice activity detection is performed by using the voice activity detection model, the accuracy of the voice activity detection is high.

Further, according to an embodiment, the target result may include at least two speech categories or/and at least two noise categories. Compared with a conventional two-category modeling method in which only two categories, namely, a speech category and a noise category, are used, this embodiment uses a multi-category modeling method, and subdivides the speech category and the noise category into different categories to which the target result belongs. For example, the speech category may be subdivided into a first speech category SPK1, a second speech category SPK2, a third speech category SPK3, and so on. The noise category may be subdivided into a first noise category SIL1, a second noise category SIL2, a third noise category SIL3, and so on. Based on the subdivision of the speech category and the noise category into multiple categories, the multi-category modeling method may be trained more effectively than that of the two-category modeling method. In a detection process, a summation only needs to be performed on a same category, and then, final scores may be compared to obtain a final category. Accordingly, the result of the detection process may be more accurate.

Figure 5:
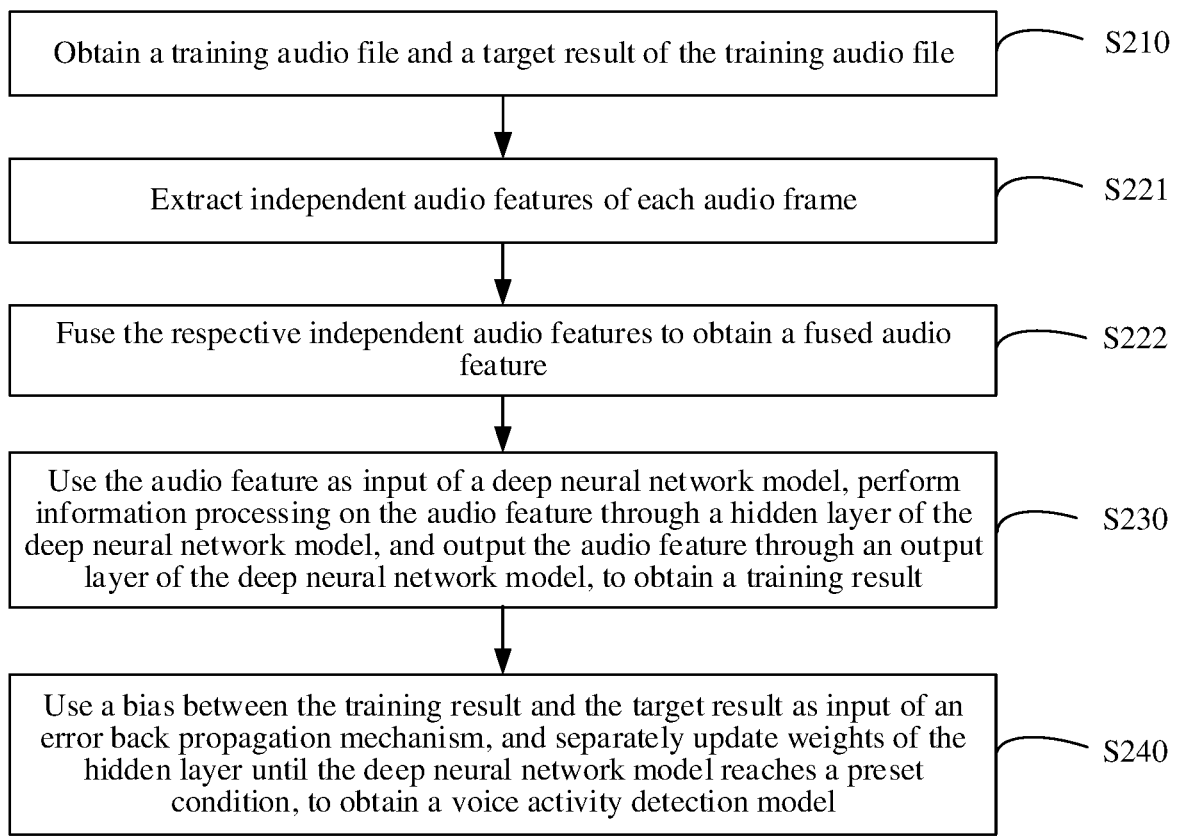
FIG. 5 is a schematic flowchart of a method for establishing a voice activity detection model according to an embodiment.

According to an embodiment, referring to FIG. 5, the audio feature may be a fused audio feature. The fused audio feature may include at least two independent audio features, and the independent audio features may include energy and at least one of a zero-crossing rate, a mean value, and a variance. The operation of extracting an audio feature of each audio frame may include the following steps.

In step S221, the method may include extracting independent audio features of each audio frame.

In step S222, the method may include fusing the respective independent audio features to obtain the fused audio feature.

Here, the independent audio feature indicates that the audio feature only includes an individual feature. In the deep neural network model, different types of independent audio features may be equal. A feature fusion method may be used to increase a quantity of dimensions of the audio feature. For example, in a case where a mean value is 40 dimensions, an energy feature increased by 10 dimensions becomes a 50-dimensional fused audio feature. Subsequently, the fused audio feature may be input into the deep neural network model.

Figure 6:
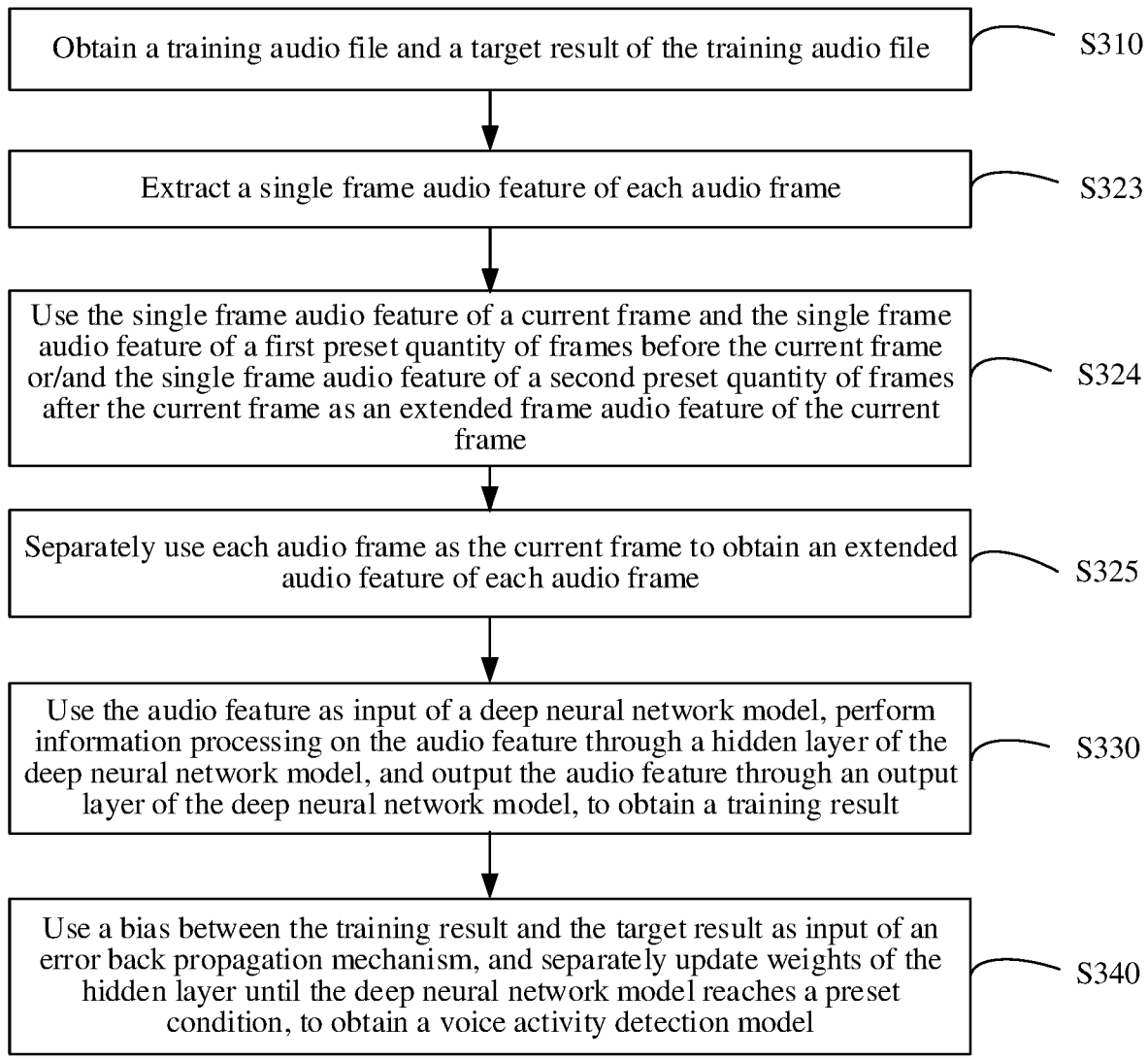
FIG. 6 is a schematic flowchart of a method for establishing a voice activity detection model according to an embodiment.

Referring to FIG. 6, according to an embodiment, the audio feature of each audio frame may be an extended audio feature. The extended frame audio feature may include a single frame audio feature of a current frame and a single frame audio feature of a first preset quantity of frames before the current frame, and/or a single frame audio feature of a second preset quantity of frames after the current frame.

The operation of extracting an audio feature of each audio frame may include the following steps.

In step S323, the method may include extracting a single frame audio feature of each audio frame.

In step S324, the method may include using the single frame audio feature of the current frame and the single frame audio feature of the first preset quantity of frames before the current frame, and/or the single frame audio feature of the second preset quantity of frames after the current frame, as the extended frame audio feature of the current frame.

Specifically, the single frame audio feature indicates that the audio feature only includes a feature of one frame. The extended frame audio feature indicates an audio feature that includes features of a plurality of frames. The plurality of frames may specifically be a current frame and a first preset quantity of frames before the current frame and/or a second preset quantity of frames after the current frame. For example, assuming that the single frame audio feature is an N-dimensional audio feature, the first preset quantity of frames is m1, and the second quantity of frames is m2, a quantity of dimensions of the extended audio feature is $N*(m1+1)$, $N*(m2+1)$, or $N*(m1+m2+1)$. Accordingly, each audio feature may be enabled by the extended audio feature to carry more information, and the accuracy of detection may be improved.

Since audio may be a short-time stable process, if the historical and future information can both be used to train the deep neural network model, an effect of the training will be better. For example, an independent audio feature of a first preset quantity of frames before a current time point (the current frame) may be historical information, and an independent audio feature of a second preset quantity of frames after the current time point may be future information. That is, the extended frame audio feature may include a single frame audio feature of a current frame, a single frame audio feature of a first preset quantity of frames before the current frame, and a single frame audio feature of a second preset quantity of frames after the current frame.

In step S325, the method may include separately using each audio frame as the current frame to obtain an extended audio feature of each audio frame.

As such, each audio feature may be extended so as to improve accuracy of audio activity detection.

Figure 7:
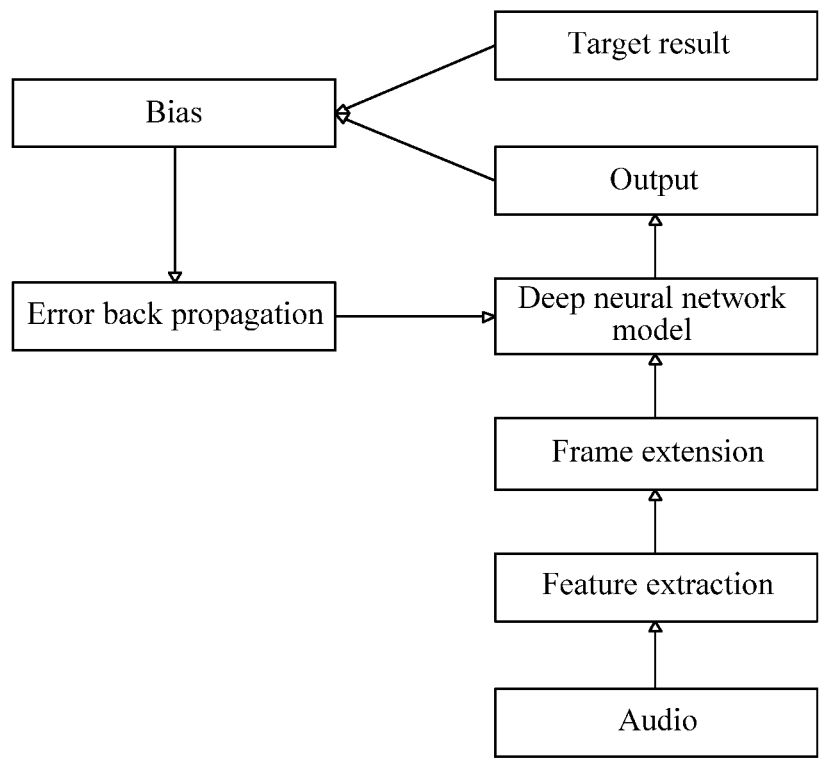
FIG. 7 is a schematic block diagram of a method for establishing a voice activity detection model according to an embodiment.

Referring to FIG. 7, which is a schematic diagram of establishing a voice activity detection model according to an embodiment, a method for establishing a voice activity detection model may include an audio obtaining operation, a target result obtaining operation, a feature extraction operation, a frame extension operation, an input operation of a deep neural network model, a bias calculation operation, and a back propagation (BP) operation. In the audio obtaining operation and the target result obtaining operation, a training audio file and a target result of the training audio file are obtained. In the feature extraction operation, the training audio file is framed, independent audio features of each audio frame are extracted, and the respective independent audio features are fused to obtain a fused audio feature. In the frame extension operation, a single frame audio feature of each audio frame is extracted to obtain a fused audio feature of each audio frame. Further, the frame extension is performed on a current frame, a first preset frame quantity of fused audio features before the current frame, and a second preset frame quantity of fused audio features after the current frame, to obtain an extended audio feature, and performed on each audio frame to obtain an extended audio feature of each audio frame. In the input operation of a deep neural network model, the extended audio feature is input to a deep neural network model, information transferring is performed through a hidden layer of the deep neural network model, and a training result is outputted through an output layer of the deep neural network model. In the bias calculation operation, a bias between the training result and the target result is calculated, the bias may be used as input to an error back propagation algorithm, and weights of the hidden layer are updated until the deep neural network model reaches a preset condition, to obtain a voice activity detection model. Furthermore, whether the deep neural network model reaches the preset condition is determined through the loss function.

Figure 8:
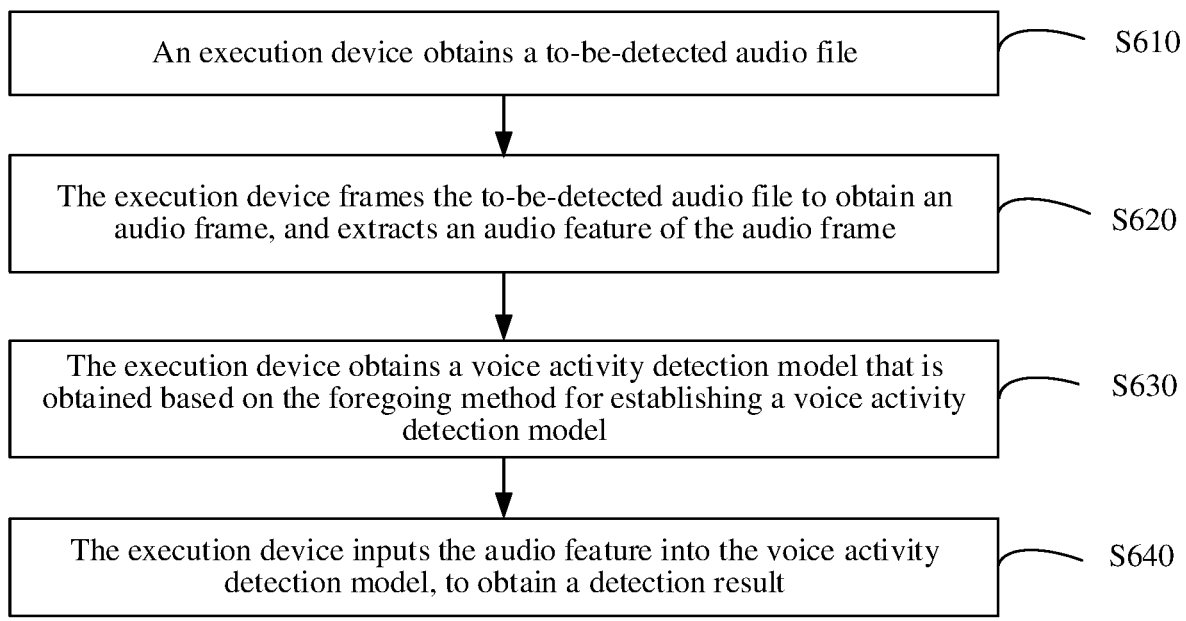
FIG. 8 is a flowchart of a voice activity detection method according to an embodiment.

Referring to FIG. 8, a voice activity detection method for establishing a voice activity detection model is provided. The voice activity detection method may also be performed on an execution device. The execution device may be a server in FIG. 1 or a client terminal in FIG. 1. The method may include the following steps.

In step S610, the method may include obtaining a to-be-detected audio file.

In step S620, the method may include framing the to-be-detected audio file to obtain an audio frame, and extracts an audio feature of the audio frame.

In step S630, the method may include obtaining the voice activity detection model that is obtained based on the foregoing method for establishing a voice activity detection model.

In step S640, the method may include inputting the audio feature into the voice activity detection model, to obtain a detection result.

According to an embodiment, it is unnecessary to obtain the target result or update the model according to the target result and the training result. It only needs to input the audio feature into the audio activity detection model and then, obtain a detection result.

Because the audio feature includes energy and at least one feature different from the energy, the audio feature may carry more information than that of a conventional detection manner. Accordingly, the deep neural network has a strong learning capability, and a plurality of different features may be input at the same time, to perform training to obtain the voice activity detection model. As a result, when the voice activity detection is performed by using the voice activity detection model, the accuracy of the voice activity detection is high.

Figure 9:
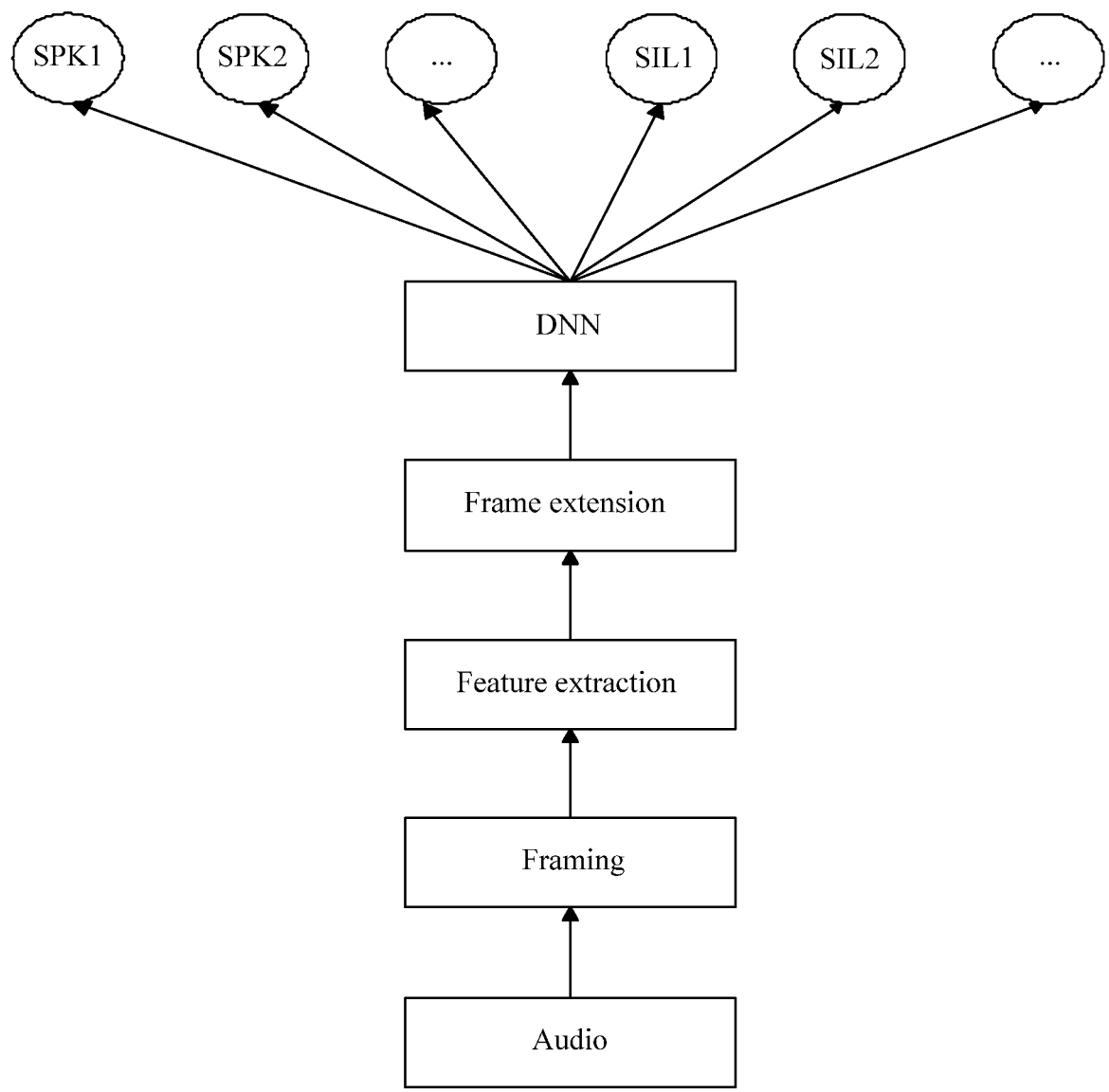
FIG. 9 is a schematic diagram of a process of a voice activity detection method according to an embodiment.

FIG. 9 is a schematic diagram of a process of the voice activity detection method. The execution device first obtains to-be-detected audio, frames the to-be-detected audio, then, performs feature extraction on each audio frame to obtain an audio feature of the audio frame. Then, the execution device performs frame extension on the audio feature to obtain an extended audio feature of each audio frame, and finally inputs the extended audio feature into a trained deep neural network model, that is, a voice activity detection model, to obtain a detection result of each audio frame of the to-be-detected audio. The detection result may be one of the target results, and the target result may include at least two speech categories or/and at least two noise categories. The speech category may be a first speech category SPK1, a second speech category SPK2, and the like, and the noise category may be a first noise category SIL1, a second noise category SIL2, and the like.

Figure 10:
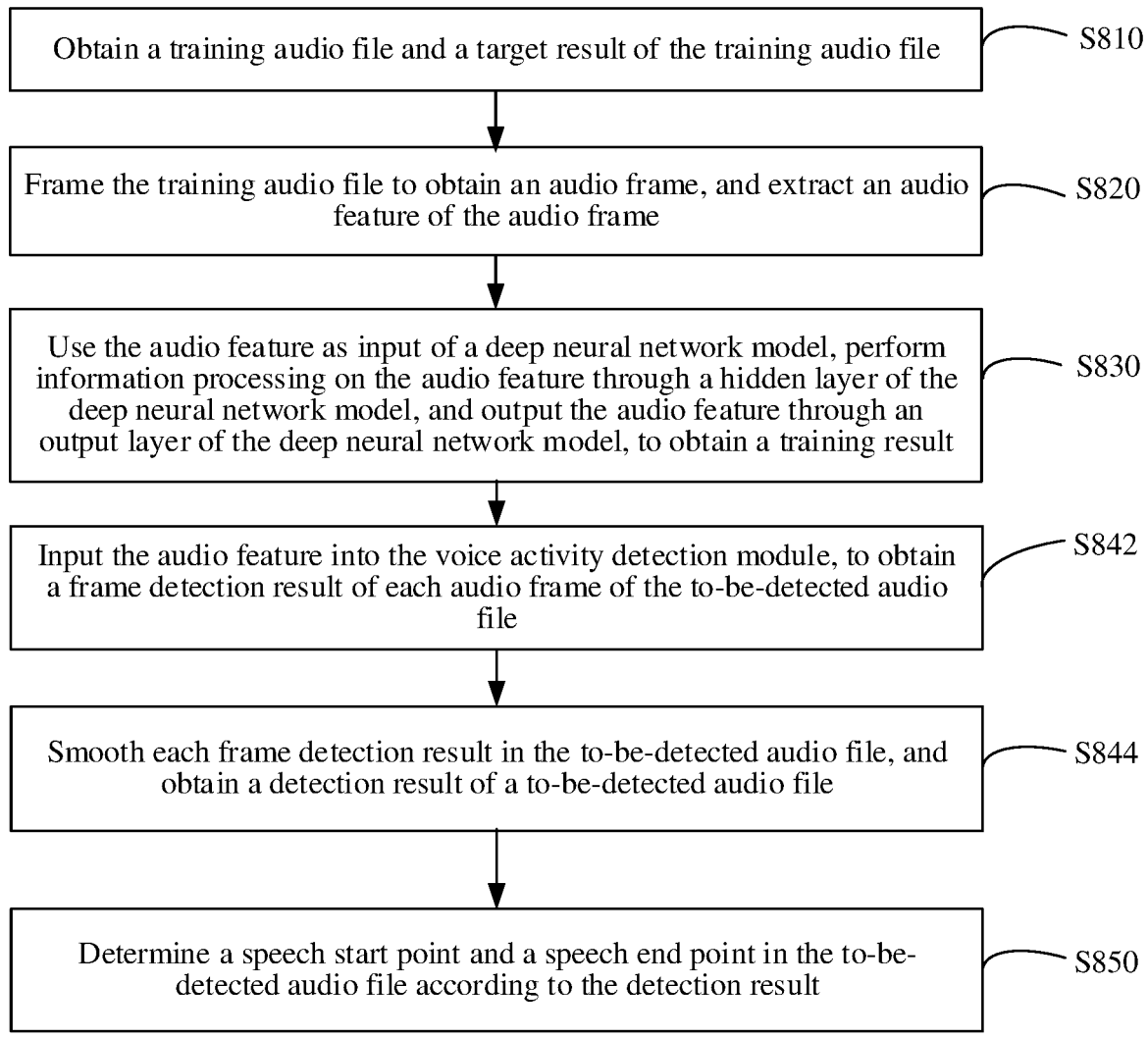
FIG. 10 is a flowchart of a voice activity detection method according to another embodiment.

As shown in FIG. 10, according to an embodiment, the operation of inputting the audio feature into the voice activity detection model to obtain a detection result may include the following steps.

In step S842, the method may include inputting the audio feature into the voice activity detection model to obtain a frame detection result of each audio frame of the to-be-detected audio file.

In step S844, the method may include smoothing each frame detection result in the to-be-detected audio file, and obtaining a detection result of the to-be-detected audio file.

According to an embodiment, after detecting each audio frame in the to-be-detected audio file to obtain a frame detection result, the execution device may perform smoothing on the frame detection result of each audio frame in the to-be-detected audio file to correct an erroneous judgment in a detection process. During a judgment process, an obvious error may inevitably occur. For example, an outputted sequence of the deep neural network model may be SPK, SPK, SPK, SIL, and SPK. It is obvious that SIL is an erroneous judgment. After smoothing, a detection result is SPK, SPK, SPK, SPK, and SPK. Accordingly, the smoothed detection result provides more accurate detection result.

Still referring to FIG. 10, after the operation of obtaining a detection result of the to-be-detected audio file, the method further include the following steps.

In step S850, the method may include determining a speech start point and a speech end point in the to-be-detected audio file in accordance with the detection result.

Further, the execution device may set a time threshold by using a sliding window. A speech start point may be found based on a length of a speech segment in the sliding window exceeding the time threshold. After the speech start point is found, a speech end point may be found based on a length of silence in the sliding window exceeding the threshold. Finally, the execution device may divide the audio into different sub-segments, such as a speech sub-segment and a noise sub-segment, according to the speech start point and the speech end point.

Figure 11:
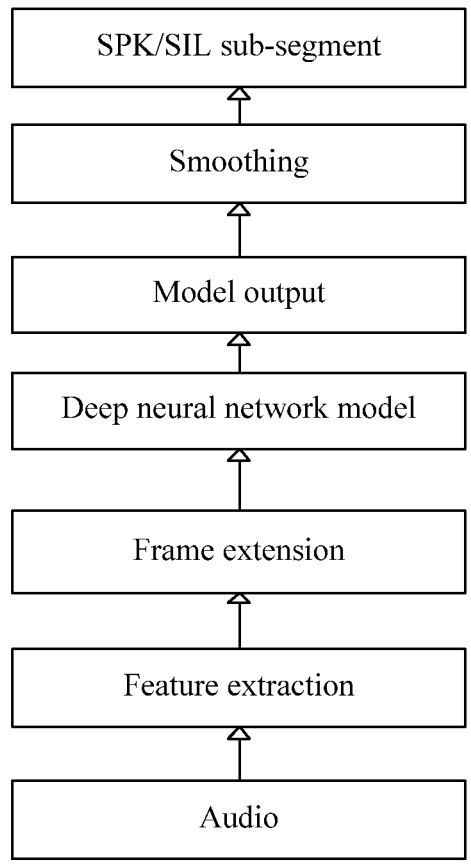
FIG. 11 is a schematic diagram of a process of a voice activity detection method according to another embodiment.

FIG. 11 is a schematic diagram of a process of the voice activity detection method according to an embodiment. The execution device may first obtain a to-be-detected audio, frame the to-be-detected audio, and then, perform feature extraction on each audio frame to obtain an audio feature of the audio frame. Further, the execution device may perform frame extension on the audio feature to obtain an extended audio feature of each audio frame, and input the extended audio feature into a trained deep neural network model, that is, a voice activity detection model, to obtain a frame detection result of each audio frame of the to-be-detected audio, which is an outputted sequence of the deep neural network model. After the frame detection result is smoothed, a detection result of the to-be-detected audio may be obtained. Then, an audio start point and an audio end point in the to-be-detected audio file may be determined according to the detection result, so as to divide the to-be-detected audio into sub-segments such as an SPK (speech) sub-segment or an SIL (noise) sub-segment.

According to an embodiment, a computer device may be provided, and an internal structure of the computer device may be the structure shown in FIG. 2. In the computer device, an apparatus for establishing a voice activity detection model may be disposed. The apparatus for establishing a voice activity detection model may include respective modules. Each module may be implemented entirely or partially through software, hardware, or a combination thereof.

Figure 12:
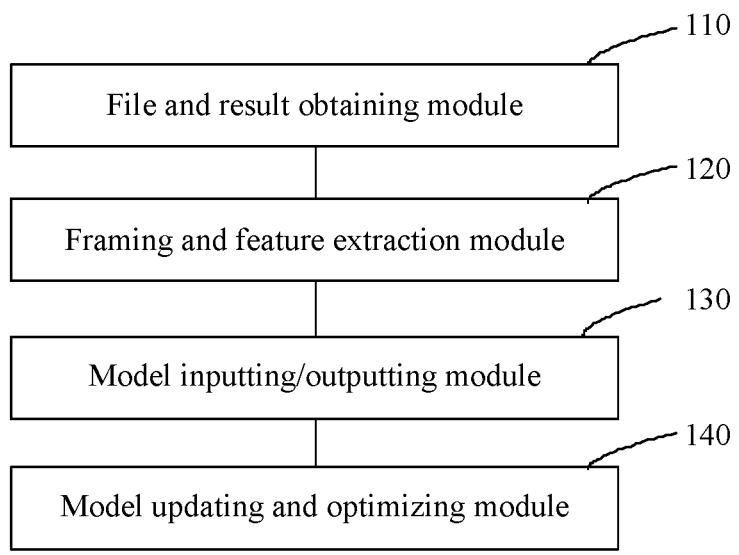
FIG. 12 is a structural block diagram of an apparatus for establishing a voice activity detection model according to an embodiment.

Referring to FIG. 12, the present disclosure provides an apparatus for establishing a voice activity detection model corresponding to the foregoing method for establishing a voice activity detection model. The apparatus for establishing a voice activity detection model is described herein.

A file and result obtaining module 110 may be configured to obtain a training audio file and a target result of the training audio file.

A framing and feature extraction module 120 may be configured to frame the training audio file to obtain an audio frame, and extract an audio feature of the audio frame, the audio feature including at least two types of features, such as energy and at least one feature different from the energy.

The model inputting/outputting module 130 may be configured to use the audio feature as an input to a deep neural network model, perform information processing on the audio feature through a hidden layer of the deep neural network model, and output the audio feature through an output layer of the deep neural network model to obtain a training result.

The model updating and optimizing module 140 may be configured to use a bias between the training result and the target result, as an input to an error back propagation mechanism, and separately update weights of the hidden layer until the deep neural network model reaches a preset condition to obtain a voice activity detection model.

In the foregoing apparatus for establishing a voice activity detection model, because the audio feature includes energy and at least one feature different from the energy, the audio feature may carry more information than that of a conventional detection manner. Accordingly, the deep neural network model has a strong learning capability, and a plurality of different features may be input at the same time, to train the model to obtain the voice activity detection model. Therefore, when the voice activity detection is performed by using the voice activity detection model, the accuracy of the voice activity detection is high.

Further, the target result may include at least two speech categories or/and at least two noise categories.

Figure 13:
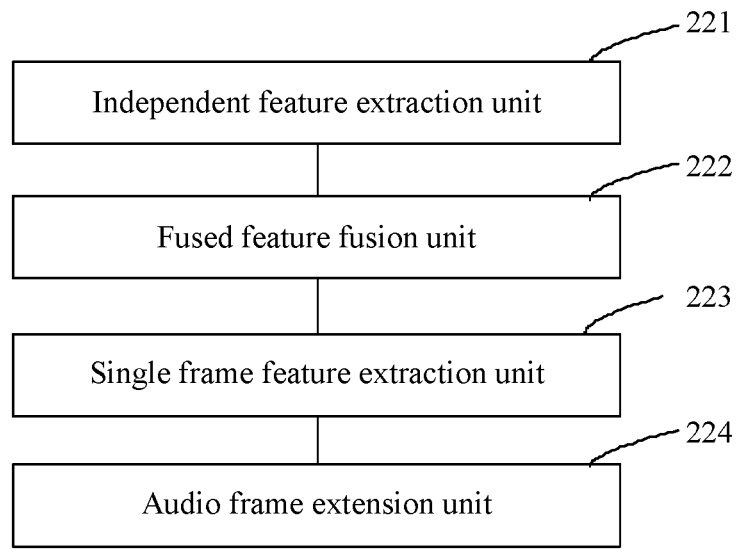
FIG. 13 is a diagram of a unit structure of a module of the apparatus for establishing a voice activity detection model according to an embodiment.

Referring to FIG. 13, according to an embodiment, the audio feature may be a fused audio feature. The fused audio feature may include at least two independent audio features, and the independent audio features may include energy and at least one of a zero-crossing rate, a mean value, and a variance. The framing and feature extraction module 220 may include an independent feature extraction unit 221 configured to extract independent audio features of each audio frame, and a fused feature fusion unit 222 configured to fuse respective independent audio features to obtain a fused audio feature.

Still referring to FIG. 11, according to an embodiment, the audio feature may be an extended audio feature. The extended frame audio feature may include a single frame audio feature of a current frame and a single frame audio feature of a first preset quantity of frames before the current frame, and/or a single frame audio feature of a second preset quantity of frames after the current frame.

The framing and feature extraction module 220 may include a single frame feature extraction unit 223 configured to extract a single frame audio feature of each audio frame, an audio frame extension unit 224 configured to use the single frame audio feature of the current frame and the single frame audio feature of the first preset quantity of frames before the current frame, and/or the single frame audio feature of the second preset quantity of frames after the current frame, as the extended frame audio feature of the current frame, and the audio frame extension unit 224 further configured to separately use each audio frame as the current frame to obtain an extended audio feature of each audio frame.

According to an embodiment, a computer device may be provided, and an internal structure of the computer device may be the structure as shown in FIG. 2. In the computer device, a voice activity detection apparatus may be disposed. The voice activity detection apparatus may include respective modules. Each module may be implemented entirely or partially through software, hardware, or a combination thereof.

Figure 14:
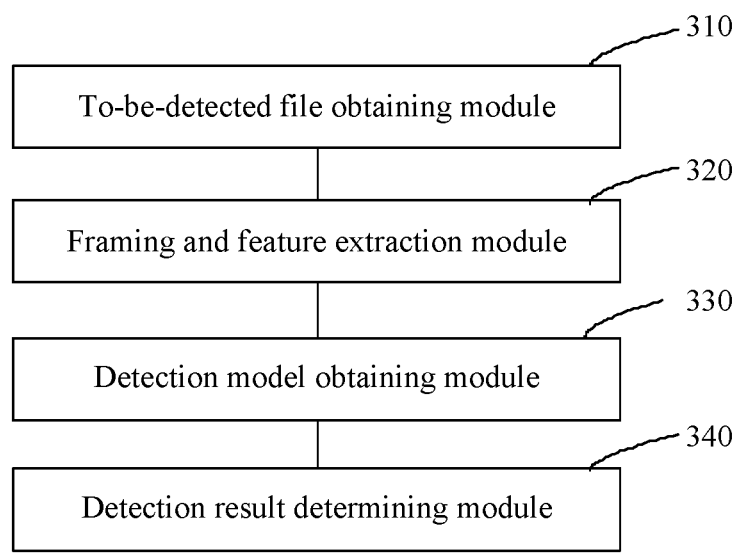
FIG. 14 is a structural block diagram of a voice activity detection model according to an embodiment.

Referring to FIG. 14, the apparatus may include a to-be-detected file obtaining module 310 configured to obtain a to-be-detected audio file, a framing and feature extraction module 320 configured to frame the to-be-detected audio file to obtain an audio frame, and extract an audio feature of the audio frame. The apparatus may further include a detection model obtaining module 330 configured to obtain the voice activity detection model that is obtained based on the foregoing method for establishing a voice activity detection model, and a detection result determining module 340 configured to input the audio feature into the voice activity detection model to obtain a detection result.

Because the audio feature includes energy and at least one feature different from energy, the audio feature carries more information than that of a conventional detection manner. Accordingly, the deep neural network has a strong learning capability, and a plurality of different features may be input at the same time, to perform training to obtain the voice activity detection model. As a result, when the voice activity detection is performed by using the voice activity detection model, the accuracy of the voice activity detection is high.

Figure 15:
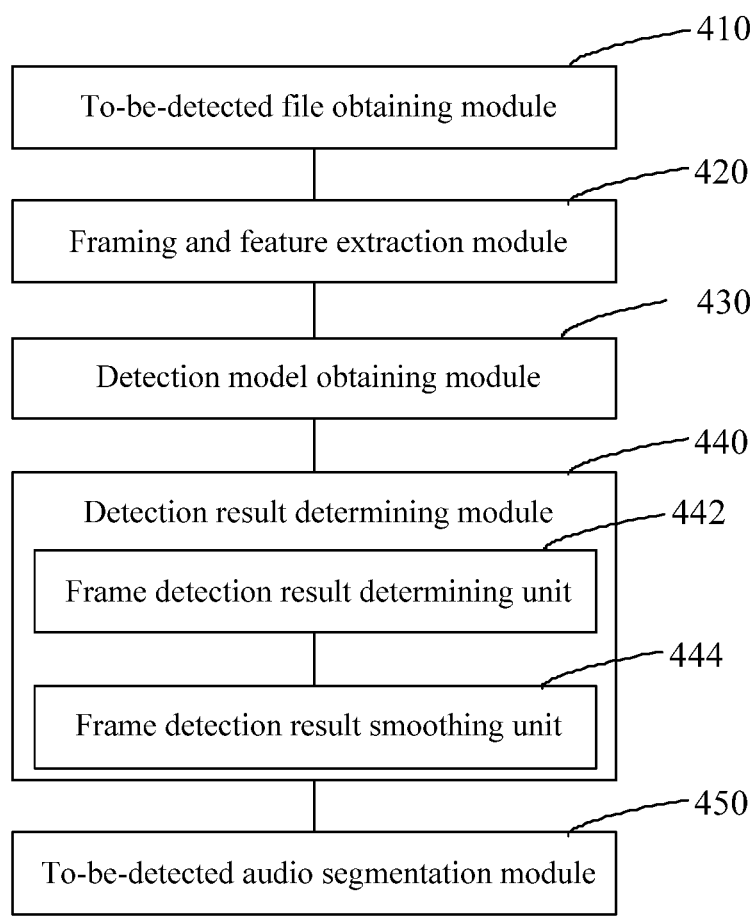
FIG. 15 is a structural block diagram of a voice activity detection model according to another embodiment.

Referring to FIG. 15, a detection result determining module 440 may include a frame detection result determining unit 442 configured to input the audio feature into the voice activity detection model, to obtain a frame detection result of each audio frame of the to-be-detected audio file, and a frame detection result smoothing unit 444 configured to smooth each frame detection result in the to-be-detected audio file, and obtain a detection result of the to-be-detected audio file.

According to an embodiment, the detection apparatus may further include a to-be-detected audio segmentation module 450 configured to determine a speech start point and a speech end point in the to-be-detected audio file according to the detection result.

The apparatus for establishing a voice activity detection model and the voice activity detection apparatus provided herein may be implemented in a form of a computer program. The computer program may run on the computer device as shown in FIG. 2. A memory in the computer device may store respective program modules constituting the apparatus for establishing a voice activity detection model and the voice activity detection apparatus, for example, a file result obtaining module 110, a framing and feature extraction module 120, a model inputting/outputting module 130, and a model updating and optimizing module 140 shown in FIG. 12. A computer program including respective program modules enables the processor to perform operations in the method for establishing a voice activity detection model in embodiments of the present disclosure.

Using an apparatus for establishing a voice activity detection model as an example, referring to FIGS. 2, 3, and 10, the computer device may perform step S110 through the file result obtaining module 110 in the apparatus for establishing a voice activity detection model. The computer device may perform step S120 through the framing and feature extraction module 120. The computer device may perform step S130 through the model inputting/outputting module 130. The computer device may perform step S140 through the model updating and optimizing module 140.

This application further provides a computer device corresponding to the foregoing method and apparatus for establishing a voice activity detection model, including a memory and a processor. The memory stores a computer program, and the computer program causes the processor to perform the following operations: obtaining a training audio file and a target result of the training audio file; framing the training audio file to obtain an audio frame, and extracting an audio feature from the audio frame, the audio feature including at least two types of features including energy and another type other than the energy; using the audio feature as an input to a deep neural network model, performing information processing on the audio feature through a hidden layer of the deep neural network model, and outputting the processed audio feature through an output layer of the deep neural network model, to obtain a training result; and using a bias between the training result and the target result as an input to an error back propagation mechanism, and separately updating weights of the hidden layer until the deep neural network model reaches a preset condition, to obtain a voice activity detection model.

The target result may include at least two speech categories and/or at least two noise categories.

According to an embodiment, the audio feature may be a fused audio feature in which the fused audio feature includes at least two independent audio features, and the independent audio features include energy and at least one of a zero-crossing rate, a mean value, and a variance. The operation of extracting an audio feature of each audio frame may include extracting independent audio features of each audio frame; and fusing the respective independent audio features to obtain the fused audio feature.

According to an embodiment, the audio feature may be an extended frame audio feature in which the extended frame audio feature includes a single frame audio feature of a current frame and a single frame audio feature of a first preset quantity of frames before the current frame, and/or a single frame audio feature of a second preset quantity of frames after the current frame. The operation of extracting an audio feature of each audio frame may include extracting the single frame audio feature of each audio frame; using the single frame audio feature of the current frame and the single frame audio feature of the first preset quantity of frames before the current frame or/and the single frame audio feature of the second preset quantity of frames after the current frame as the extended frame audio feature of the current frame; and separately using each audio frame as the current frame to obtain an extended audio feature of each audio frame.

The present disclosure further provides a computer device corresponding to the foregoing voice activity detection method and apparatus, including a memory and a processor. The memory stores a computer program, and the computer program causes the processor to obtain a to-be-detected audio file; frame the to-be-detected audio file to obtain an audio frame, and extract an audio feature of the audio frame; obtain the voice activity detection model that is obtained based on the foregoing method for establishing a voice activity detection model; and input the audio feature into the voice activity detection model to obtain a detection result.

Furthermore, the operation of inputting the audio feature into the voice activity detection model, to obtain a detection result, may include inputting the audio feature into the voice activity detection module, to obtain a frame detection result of each audio frame of the to-be-detected audio file; and smoothing each frame detection result in the to-be-detected audio file, and obtaining a detection result of the to-be-detected audio file.

After obtaining a detection result of the to-be-detected audio file, the computer device may be further configured to determine a speech start point and a speech end point in the to-be-detected audio file according to the detection result.

According to an embodiment, a non-volatile storage medium corresponding to the foregoing method and apparatus for establishing a voice activity detection model may be implemented. One or more non-volatile storage mediums storing a computer program may be provided, and may be configured to perform: obtaining a training audio file and a target result of the training audio file; framing the training audio file to obtain an audio frame, and extracting an audio feature of the audio frame, the audio feature including at least two types of features including energy and another type other than the energy; using the audio feature as an input to a deep neural network model, performing information processing on the audio feature through a hidden layer of the deep neural network model, and outputting the audio feature through an output layer of the deep neural network model, to obtain a training result; and using a bias between the training result and the target result as input of an error back propagation mechanism, and separately updating weights of the hidden layer until the deep neural network model reaches a preset condition, to obtain a voice activity detection model.

In addition, the target result may include at least two speech categories and/or at least two noise categories.

According to an embodiment, the audio feature may be a fused audio feature in which the fused audio feature may include at least two independent audio features, and the independent audio features may include energy and at least one of a zero-crossing rate, a mean value, and a variance. Further, the operation of extracting an audio feature of each audio frame may include extracting independent audio features of each audio frame; and fusing the respective independent audio features to obtain the fused audio feature.

According to an embodiment, the audio feature may be an extended frame audio feature, the extended frame audio feature may include a single frame audio feature of a current frame and a single frame audio feature of a first preset quantity of frames before the current frame, and/or a single frame audio feature of a second preset quantity of frames after the current frame. The operation of extracting an audio feature of each audio frame may include extracting the single frame audio feature of each audio frame; and using the single frame audio feature of the current frame and the single frame audio feature of the first preset quantity of frames before the current frame, and/or the single frame audio feature of the second preset quantity of frames after the current frame, as the extended frame audio feature of the current frame; and separately using each audio frame as the current frame to obtain an extended audio feature of each audio frame.

Furthermore, a non-volatile storage medium corresponding to the foregoing voice activity detection method and apparatus may be implemented. One or more non-volatile storage mediums storing a computer program may be provided, and the computer program may cause one or more processors to: obtain a to-be-detected audio file; frame the to-be-detected audio file to obtain an audio frame, and extract an audio feature from the audio frame; obtain the voice activity detection model that is obtained based on the foregoing method for establishing a voice activity detection model; and input the audio feature into the voice activity detection model, to obtain a detection result.

In addition, the operation of inputting the audio feature into the voice activity detection model, to obtain a detection result, may include inputting the audio feature into the voice activity detection module to obtain a frame detection result of each audio frame of the to-be-detected audio file; and smoothing each frame detection result in the to-be-detected audio file, and obtaining a detection result of the to-be-detected audio file.

Further still, after the operation of obtaining a detection result of the to-be-detected audio file, the operation of obtaining may further include determining a speech start point and a speech end point in the to-be-detected audio file according to the detection result.

A person of ordinary skill in the art may understand that all or some of the processes of the methods herein may be implemented by a computer program instructing a hardware. The program may be stored in a non-transitory computer-readable storage medium. When the program operates, the methods described herein may be performed. Any reference to the memory, storage, database, or another medium used in the respective embodiments provided in the present disclosure may include a non-volatile and/or volatile memory. The non-volatile memory may include a read only memory (ROM), a programmable ROM (PROM), an electrically programmable ROM (EPROM), an electrically erasable programmable ROM (EEPROM), or a flash memory. The volatile memory may include a random access memory (RAM) or an external cache memory. A RAM may be available in a variety of forms, such as a static RAM (SRAM), a dynamic RAM (DRAM), a synchronous DRAM (SDRAM), a double data rate SDRAM (DDRSDRAM), an enhanced SDRAM (ESDRAM), a synchronized link (Synchlink) DRAM (SLDRAM), a memory bus (Rambus) direct RAM (RDRAM), a direct memory bus dynamic RAM (DRDRAM), and a memory bus dynamic RAM (RDRAM).

Technical features of the embodiments described herein may be randomly combined. To make description concise, not all combinations of the technical features of the embodiments are described. However, as long as combinations of these technical features do not contradict each other, it is to be considered that the combinations all fall within the scope of the present disclosure.

The embodiments described herein only show several implementations of the present disclosure, but they are not to be construed as a limitation to the patent scope of the present disclosure. A person of ordinary skill in the art may make various changes and improvements without departing from the ideas of the present disclosure, which shall all fall within the protection scope of the present disclosure.

What is claimed is:

1. A method for establishing a voice activity detection model, the method being performed by an execution device, the method comprising: obtaining a training audio file and a target result of the training audio file; framing the training audio file to obtain an audio frame; extracting an audio feature of the audio frame, the audio feature comprising at least two types of features, and one of the at least two types of features comprising an energy; inputting the extracted audio feature as an input to a deep neural network model; performing information processing on the audio feature through a hidden layer of the deep neural network model, and outputting the processed audio feature through an output layer of the deep neural network model, to obtain a training result; determining a bias between the training result and the target result, and inputting the bias as an input to an error back propagation mechanism; and separately updating weights of the hidden layer until the deep neural network model reaches a preset condition, to obtain the voice activity detection model, wherein the target result comprises at least one of at least two speech categories and at least two noise categories, wherein the audio feature of the audio frame is an extended frame audio feature, the extended frame audio feature comprising at least one of a single frame audio feature of a current frame, and a first single frame audio feature of a first preset quantity of frames before the current frame, or a single frame audio feature of a current frame, and a second single frame audio feature of a second preset quantity of frames after the current frame, and wherein the extracting the audio feature of each audio frame further comprises: extracting the single frame audio feature of each audio frame; setting the at least one of the single frame audio feature of the current frame, and the first single frame audio feature of the first preset quantity of frames before the current frame, or the single frame audio feature of the current frame, and the second single frame audio feature of the second preset quantity of frames after the current frame, as the extended frame audio feature of the current frame; and separately using each audio frame as the current frame to obtain an extended audio feature of each audio frame.

2. The method for establishing the voice activity detection model according to claim 1, wherein the audio feature is a fused audio feature, the fused audio feature comprising at least two independent audio features, and the independent audio features comprising the energy and at least one of a zero-crossing rate, a mean value, and a variance, and
   wherein the extracting the audio feature of each audio frame further comprises extracting independent audio features of each audio frame and fusing the respective independent audio features to obtain the fused audio feature.

3. A voice activity detection method, the method being performed by an execution device, the method comprising:
   obtaining a to-be-detected audio file;
   framing the to-be-detected audio file to obtain an audio frame, and extracting an audio feature of the audio frame;
   obtaining the voice activity detection model that is obtained based on the method for establishing the voice activity detection model according to claim 1; and
   inputting the audio feature into the voice activity detection model to obtain a detection result.

4. The voice activity detection method according to claim 3, wherein the inputting the audio feature into the voice activity detection model to obtain the detection result further comprises:
   inputting the audio feature into the voice activity detection model, to obtain a frame detection result of each audio frame of the to-be-detected audio file; and
   smoothing each frame detection result in the to-be-detected audio file, and obtaining a detection result of the to-be-detected audio file.

5. The voice activity detection method according to claim 4, wherein, after the obtaining the detection result of the to-be-detected audio file, the method further comprises:
   determining a speech start point and a speech end point in the to-be-detected audio file according to the detection result.

6. A computer device, comprising: at least one memory configured to store computer program code; and at least one processor configured to access the computer program code and operate as instructed by the computer program code, the computer program code comprising: file obtaining code configured to cause the at least one processor to obtain a training audio file; result obtaining code configured to cause the at least one processor to obtain a target result of the training audio file; framing code configured to cause the at least one processor to frame the training audio file to obtain an audio frame; extraction code configured to cause the at least one processor to extract an audio feature of the audio frame, the audio feature comprising at least two types of features, and one of the at least two types of features comprising an energy; inputting code configured to cause the at least one processor to input the audio feature as an input to a deep neural network model, and perform information processing on the audio feature through a hidden layer of the deep neural network model; outputting code configured to cause the at least one processor to output the processed audio feature through an output layer of the deep neural network model, to obtain a training result; and update and optimizing code configured to cause the at least one processor to determine a bias between the training result and the target result as an input to an error back propagation mechanism, and separately update weights of the hidden layer until the deep neural network model reaches a preset condition, to obtain a voice activity detection model, wherein the target result comprises at least one of at least two speech categories and at least two noise categories, and wherein the audio feature of the audio frame is an extended frame audio feature, the extended frame audio feature comprising at least one of a single frame audio feature of a current frame, and a first single frame audio feature of a first preset quantity of frames before the current frame, or a single frame audio feature of a current frame, and a second single frame audio feature of a second preset quantity of frames after the current frame, and wherein the computer device further comprises: single frame feature extraction code configured to cause the at least one processor to extract the single frame audio feature of each audio frame; and audio frame extension code configured to cause the at least one processor to set the at least one of the single frame audio feature of the current frame, and the first single frame audio feature of the first preset quantity of frames before the current frame, or the single frame audio feature of the current frame, and the second single frame audio feature of the second preset quantity of frames after the current frame, as the extended frame audio feature of the current frame, and separately use each audio frame as the current frame to obtain an extended audio feature of each audio frame.

7. The computer device according to claim 6, wherein the audio feature is a fused audio feature, the fused audio feature comprising at least two independent audio features, and the independent audio features comprising the energy and at least one of a zero-crossing rate, a mean value, and a variance, and
wherein the computer device further comprises:
independent feature extraction code configured to cause the at least one processor to extract independent audio features of each audio frame; and
feature fusion code configured to cause the at least one processor to fuse the respective independent audio features to obtain the fused audio feature.

8. A computer device comprising:
at least one memory configured to store the computer program code; and
at least one processor configured to access the computer program code and operate as instructed by the computer program code, the computer program code comprising:
to-be-detected file obtaining code configured to cause the at least one processor to obtain a to-be-detected audio file;
framing code configured to cause the at least one processor to frame the to-be-detected audio file to obtain an audio frame;
extraction code configured to cause the at least one processor to extract an audio feature of the audio frame;
detection model obtaining code configured to cause the at least one processor to obtain the voice activity detection model that is obtained based on the computer device according to claim 6; and
detection result determining code configured to cause the at least one processor to input the audio feature into the voice activity detection model, to obtain a detection result.

9. The computer device according to claim 8, wherein the detection result determining code is further configured to cause the at least one processor to:
input the audio feature into the voice activity detection model to obtain a frame detection result of each audio frame of the to-be-detected audio file; and
smooth each frame detection result in the to-be-detected audio file, and obtain a detection result of the to-be-detected audio file.

10. The computer device according to claim 9, wherein the detection result determining code is further configured to cause the at least one processor to determine a speech start point and a speech end point in the to-be-detected audio file according to the detection result.

11. A non-transitory computer-readable storage medium, storing executable instructions, the executable instructions capable of causing a computer to: obtain a training audio file and a target result of the training audio file; frame the training audio file to obtain an audio frame; extract an audio feature of the audio frame, the audio feature comprising at least two types of features, and one of the at least two types of features comprising an energy; input the audio feature as an input to a deep neural network model, performing information processing on the audio feature through a hidden layer of the deep neural network model, and output the processed audio feature through an output layer of the deep neural network model, to obtain a training result; and determine a bias between the training result and the target result as an input to an error back propagation mechanism, and separately update weights of the hidden layer until the deep neural network model reaches a preset condition, to obtain a voice activity detection model, wherein the target result comprises at least one of at least two speech categories and at least two noise categories, and wherein the audio feature of the audio frame is an extended frame audio feature, the extended frame audio feature comprising at least one of a single frame audio feature of a current frame, and a first single frame audio feature of a first preset quantity of frames before the current frame, or a single frame audio feature of a current frame, and a second single frame audio feature of a second preset quantity of frames after the current frame, and wherein the executable instructions are further capable of causing the computer to: extract the single frame audio feature of each audio frame; set the at least one of the single frame audio feature of the current frame, and the first single frame audio feature of the first preset quantity of frames before the current frame, or the single frame audio feature of the current frame, and the second single frame audio feature of the second preset quantity of frames after the current frame, as the extended frame audio feature of the current frame; and separately using each audio frame as the current frame to obtain an extended audio feature of each audio frame.

12. The non-transitory computer-readable storage medium according to claim 11, wherein the audio feature is a fused audio feature, the fused audio feature comprising at least two independent audio features, and the independent audio features comprising the energy and at least one of a zero-crossing rate, a mean value, and a variance, and
wherein the executable instructions are further capable of causing the computer to:
extract independent audio features of each audio frame; and
fuse the respective independent audio features to obtain the fused audio feature.

13. A non-transitory computer-readable storage medium, storing executable instructions, the executable instructions capable of causing a computer to:
obtain a to-be-detected audio file;
frame the to-be-detected audio file to obtain an audio frame, and extract an audio feature of the audio frame;
obtain the voice activity detection model of claim 11; and
input the audio feature into the voice activity detection model to obtain a detection result.

14. The non-transitory computer-readable storage medium according to claim 13, wherein the executable instructions are further capable of causing the computer to:
input the audio feature into the voice activity detection model, to obtain a frame detection result of each audio frame of the to-be-detected audio file; and
smooth each frame detection result in the to-be-detected audio file, and obtain a detection result of the to-be-detected audio file.

* * * * *